(12) United States Patent  
Rising, III

(10) Patent No.: US 7,664,830 B2
(45) Date of Patent: Feb. 16, 2010

(54) METHOD AND SYSTEM FOR UTILIZING EMBEDDED MPEG-7 CONTENT DESCRIPTIONS

(75) Inventor: Hawley K. Rising, III, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1585 days.

(21) Appl. No.: 10/112,610

(22) Filed: Mar. 29, 2002

(65) Prior Publication Data

US 2003/0187950 A1    Oct. 2, 2003

(51) Int. Cl.
G06F 15/16 (2006.01)
G06F 17/30 (2006.01)

(52) U.S. Cl. .......................... 709/218; 707/10
(58) Field of Classification Search ................ 709/218; 705/400; 707/10
See application file for complete search history.

(56) References Cited

U.S. PATENT DOCUMENTS 5,386,369 A * 1/1995 Christiano .................. 705/400
6,078,914 A * 6/2000 Redfern .......................... 707/3
6,321,228 B1 * 11/2001 Crandall et al. ................ 707/10
6,411,724 B1 * 6/2002 Vaithilingam et al. ....... 382/100
6,578,022 B1 * 6/2003 Foulger et al. ................ 706/45
6,593,936 B1 * 7/2003 Huang et al. ................. 345/619
6,741,655 B1 * 5/2004 Chang et al. ........... 375/240.26
6,775,666 B1 * 8/2004 Stumpf et al. ................... 707/5
6,895,406 B2 * 5/2005 Fables et al. ................. 707/102
7,185,049 B1 * 2/2007 Benitez et al. ............... 709/203

* cited by examiner

*Primary Examiner*—Andrew Caldwell
*Assistant Examiner*—Benjamin Ailes
(74) *Attorney, Agent, or Firm*—John P. O'Banion

(57) ABSTRACT

An apparatus for selecting digital material objects containing MPEG-7 content descriptions in response to MPEG-7 content description queries. The apparatus comprises an MPEG-7 content description query generation tool coupled with a search engine configured for searching and comparing embedded MPEG-7 META tag information within file headers, or database information thereof, to the MPEG-7 content description query. The query tool and search engine may be implemented separately or in combination. By way of example, the MPEG-7 query generation tool is implemented within an application program such as a browser, or web site, to allow the user to readily and accurately define the content being sought. The content query being sent to a search engine configured for performing MPEG-7 content searches that return hits based on content related matches.

48 Claims, 15 Drawing Sheets

```
<HTML>
<HEAD>
<META NAME="MPEG7Unit" CONTENT="<MPEG7Unit>
   MPEG-7 description here
</MPEG7Unit> >
<META NAME="Robot" CONTENT="all">
</HEAD>
<BODY>
...web page...
</BODY>
</HTML>
```

FIG. 16

METHOD AND SYSTEM FOR UTILIZING EMBEDDED MPEG-7 CONTENT DESCRIPTIONS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A COMPUTER PROGRAM APPENDIX

Not Applicable

BACKGROUND OF THE INVENTION

1. Field of the Invention

The invention pertains to content query mechanisms for use with digital content-laden material, and more particularly to methods of constructing and executing queries directed at digital materials containing, or associated with, MPEG-7 content descriptions.

2. Description of the Background Art

Vast quantities of content are currently available within private and public databases, with internet-based content aggregation and distribution being a highly visible segment of Internet commerce. Systems and applications capable of searching through content databases, however, have been largely confined to finding textually based resources. The selection of multimedia content from a database generally remains difficult, inaccurate, and highly laborious. It will be appreciated that searching for multimedia content within a large repository has largely outpaced the ability of current query and searching tools. Presently, a party searching for content to meet a set of selection criterion is often required to load and manually check objects against the selection criterion.

Recently, however, standards have begun to emerge for characterizing various multimedia sources. The MPEG-7 standard is one such standard that provides a substantially uniform set of metrics for identifying characteristics of a digital source, in particular multimedia sources. A working group of ISO/IEC referred to as the Moving Pictures Expert Group has created a content description system known as MPEG-7. The new MPEG-7 standard provides a content description standard, which should not be confused with multimedia representation standards, such as MPEG-1, and MPEG-2. The MPEG-7 standard provides a universal and extensible set of content descriptions which utilize description schemes and descriptors to describe aspects of digital material objects including: format, size, type, encoding, basic structures, colors, textures, shapes, motion, speech annotations, timbre, melody, content related terms, syntactic structures, semantic structures, syntactic-semantic links, relationships, as well as a large set of additional content description metrics. FIG. 1 is an example of graphical color characterization, generally referred to as color histogramming, for an image whose colors are shown quantized into individual RGB components. The color information from the histogram is an example of information which may be included within an MPEG-7 content description. Although MPEG-7 may be utilized for characterizing multimedia content, there is an attendant lack of convenient methods and systems by which a user may search content resources associated with MPEG-7 descriptions.

Therefore, a need exists for a method and system which facilitates the selection of content, in particular forms of multimedia content, from within a database or network. The present system fulfills that need, as well as others, while being organized to ease implementation within the present network infrastructure and to overcome deficiencies in previously developed mechanisms for selecting content.

BRIEF SUMMARY OF THE INVENTION

The present invention comprises methods and systems for providing efficient and accurate content searching of content resources and content information databases, associated with digital material objects, such as multimedia files which may include such file types as audio, video, animations, music, images, sound effects, graphics, CAD files, recordings, icons, and other forms of information which extend beyond a text-only nature. It will be appreciated that in order to search for non-textual content, a content description system must be employed wherein the desired search metrics may be quantized and compared with a target set of resources in which matches are being sought. A viable content description system should be capable of describing the various forms of multimedia content, while providing a standard that facilitates interoperability between business parties, for example between parties engaged in quid pro quo content transactions. The present invention provides various methods and systems for searching digital material objects according to MPEG-7 content descriptions. By way of example, the MPEG-7 descriptions upon which the searches are based preferably contain MPEG-7 META data within the header of the digital material. For example a file may contain a markup language, such as SGML, or subsets such as those inclusive of HTML, XML, or WAP. An example of META tag embedding is described at a later point within the specification.

However, the embedding of content information, by itself, does not facilitate content based searches within a set of material resources. The present invention teaches methods and systems that utilize embedded MPEG-7 content description information to increase the efficiency and accuracy of searches and queries based on MPEG-7 content descriptions. Furthermore, the present method is capable of providing information about how a search progressed so that the content information and search structures may be improved while information is accumulated about user preferences.

By way of example, the present invention provides a system comprising one or more computers having network interface connectivity for communicating to and from users for executing content related searches. Programming executable on the computers include an interface routine configured for receiving MPEG-7 content descriptions, and a string search routine configured to search through an associated database, or file collection, and return information about files whose associated headers contain MPEG-7 content description elements that coincide with the MPEG-7 content descriptions received by the interface routine. The programming may further include routines for collecting information about the search queries which may be passed to a destination web site upon selecting a link to it amongst the search results. It will be appreciated that web servers are commonly employed to provide services such as searching, wherein the present invention may be readily implemented on these systems, and others, by the inclusion of additional programming as described.

To allow a user to search a set of data resources containing MPEG-7 content descriptions, a mechanism is required for describing the content being sought, referred to as an MPEG-7 content description query; and an associated mechanism for applying the query against the set of resources, referred to as a search engine configured for MPEG-7 content description searching. The present invention describes query generation tools and search engines configured for searching content resources which have an associated MPEG-7 content description, such as embedded META data containing MPEG-7 content descriptions. It will be appreciated that the systems and methods described may be utilized separately or in combination.

The query generation tool comprises an interface upon which an MPEG-7 content description query is constructed, and preferably includes a set of query resources that facilitate query construction. By way of example, the interface may be hosted on a web site which may provide query functions, query examples, saved queries, macros, a syntax checker, and a query converter which formats the query for a specific search resource to which the query is to be submitted. The MPEG-7 query generation tool preferably allows the user to create queries based on content characteristics and content statistics, such as color histogramming, and further provides for the entry of non-text forms of characterization data, such as content query metrics via graphical manipulation and sketches. In addition, the query generator preferably provides a query library of query elements and query functions such that a user, even one with scant knowledge of MPEG-7 constructs, may readily construct accurate MPEG-7 based queries. Included in the functions are macro constructs which are selected, or entered, by the user as a compact form of parameter entry that may then be converted to a standardized, or customized, representation as the query is passed to a specific search engine. A simple example of such a macro could be considered in the selection of a "time of day" parameter associated with a video clip, wherein a user specified time period of "sunset" for the filming of a piece of video footage can be expanded to include terms, phrases, and functions which are synonymous with "sunset" to assure a broadened search breadth within the collection of content resources. In addition, a library of query examples and elements is provided that allows a user to select predefined query elements for inclusion within a query under construction. The user may elect to modify existing queries, or alter existing queries for new search metrics, or cut and paste only the desired query elements. The present system also preferably provides for the creation of complex structured queries, wherein term elements of a search are constructed and then may be assembled in various ways to arrive at the resultant MPEG-7 content description query. The use of terms facilitates the rapid creation of query variations and list ordering preferences without the necessity of rewriting the separate terms of the query.

Response ordering may be user selected as either inherently derived or explicitly stated. Inherent result ordering can be performed based on the order and relationship of elements within the MPEG-7 search query, as well as the relative paucity, or abundance, of result matching in accord with the separate terms of the query. In explicitly stated response ordering, the user specifies response ordering terms that define how the responses, "hits", are to be arranged. Explicit result ordering preferably still maintains an inherent ordering within its stated subterms, and that of the query itself, which operate to refine the explicit ordering. The ordering of the results and display methods thereof being performed within the query generation engine, a result display routine, or the search engine receiving the query and associated list order information.

The query tool preferably also provides intelligent query building wherein the user specifies a known element, query, or query element, along with an associated relationship in response to which the system generates queries based on the known information and expressed relationships that the user can prune to more readily arrive at a desired target query. For example, consider a simple case in which the user selects an image, for instance of a ripe banana, and directs the system to generate a query for similar images. The system characterizes the image and can collect additional feedback from the user (i.e. range of image sizes) to improve the accuracy of the search query being generated.

The syntax of the queries being built within the system are checked for compliance with the syntax definitions for the query generation tool and in relation to the MPEG-7 definitions. Warnings and errors are generated according to preset preferences when the text of the query does not comply with the query generation tool or the MPEG-7 definitions. It will be appreciated that the syntax entered into the system may not be directly compliant with MPEG-7 content descriptions, because the query generation tool is capable of supporting extended query generation features, such as macros and other extended functionality.

The generated MPEG-7 queries are submitted for execution to a search engine that is configured to search content resources, that wholly or in part, are associated with MPEG-7 content descriptions that are preferably embedded as META data within the digital material object headers. Responses from the search engine may be displayed within the query generation tool, and the query may be iteratively adjusted until a suitably limited set of accurately targeted results is returned. In addition, the system allows the user to select objects within the returned object list, and characteristics thereof, as inputs to further refine the generated MPEG-7 content search query.

It should be appreciated that search engines are typically capable of performing a "direct search" within a collection (database) of digital material objects, or an "indirect search" within a database of information assembled about a collection of digital material objects. By way of example, search engines utilized for internet searching execute their searches within a database containing an indexed set of keywords and other information that was previously assembled by analyzing each piece of digital material submitted to create database entries. It will be recognized that the use of direct searching within a collection spanning the size and having the distributed nature of the Internet would result in ponderously slow searches while unduly increasing Internet traffic. The ability of a search engine to perform both direct and indirect searches is well known in the art. References, therefore, to one form of searching imply that the alternative form of searching can be similarly applied; barring any express statements to the contrary for specific situations. For example, references to a "collection of digital material objects containing embedded MPEG-7 content descriptions" within which a search is to be performed are also applicable to a "database of information about a collection of digital material objects containing embedded MPEG-7 content descriptions" within which a search is to be performed, since the MPEG-7 content descriptions can be made available in either case.

The MPEG-7 query generation tool may be hosted within the aforementioned web site, or alternatively hosted as an application executing within other computational resources, such as in concert with a browser, or in association with a search routine. Users may gain the benefits of the aforementioned MPEG-7 query generation tool in a variety of ways, including purchasing query generation software, paying per use charges that are based on subscriptions, time of use, queries generated, and so forth. The query generation tool may be utilized by third parties which provide query generation services to users. In addition, the query generation and search capability may be provided free so that traffic may be driven to a site, or sites.

After creation, an MPEG-7 content description query is submitted for execution to a search engine configured according to the present invention which provides for MPEG-7 content description searching. The search engine receives and parses the incoming content description queries to create intermediate search information which is applied within the search engine for comparisons with prospective digital material objects, or information collected about said objects. Although search engines traditionally create databases of indexed keywords, and relationships, against which incoming queries are applied; it should, however, be appreciated that collections (especially limited collections stored locally) may be searched directly. The search engine of the present invention is configured to recognize MPEG-7 content descriptions associated with the digital material objects being searched, and to apply MPEG-7 query terms against these descriptions in search of a match. The search engine may additionally support functional extensions of the MPEG-7 content descriptions to correspond with functions supported in an associated query generation tool. Query matches found by the search engine may be directly returned to the query generation tool, or user. Alternatively, the returned matches may be ordered within the search engine according to information contained within the query, or explicit ordering statements. For example, the listing order may be determined by explicit query statements that define the desired ordering of the responses; while inherent ordering information can be derived from the relationships of query elements themselves, such as by their relative position within the query.

In addition it should be appreciated that MPEG-7 content descriptions may be automatically generated, such as by the back end of the search engine, or a spider program, such as selectively based on a fee, when it analyzes a site for inclusion or update. The routine may characterize multimedia content on the site and generate MPEG-7 content descriptions accordingly. Descriptions such as these can then be utilized automatically or perhaps for a fee, as follows: (1) included in search database but not necessarily embedded within the elements of content, (2) automatically appended within the headers of the site, and (3) sent to the webmaster of the site for their use in changing the site content.

The present invention also teaches query capture methods which are capable of supplying originating query information to vendors associated with searches whereby the vendors can collect market information that can be utilized to improve the quality of the embedded content information and determine the direction and extent of ongoing marketing efforts.

An object of the invention is to increase the speed and accuracy with which desired content, in particular multimedia content, may be extracted from a content resource.

Another object of the invention is to provide a content searching system and method that may be readily implemented within the infrastructures of existing content resources.

Another object of the invention is to provide content searching mechanisms for use with content descriptions defined by MPEG-7.

Another object of the invention is to provide a content searching system and method that accepts non-textual user content information and thereafter generates a corresponding MPEG-7 content query.

Another object of the invention is to provide a content searching system and method in which the user may input sketches to define relevant MPEG-7 content description metrics for a query.

Another object of the invention is to provide a content searching system and method in which the user may input content samples and relationships between the samples and content being sought as input for query generation.

Another object of the invention is to provide a content searching system and method in which the query and associated matches returned from one MPEG-7 content query may be utilized within subsequent queries to increase search accuracy.

Another object of the invention is to provide an MPEG-7 query generation tool that may be utilized within a variety of applications, such as web browsers, web sites, stand-alone applications, or integrated within existing applications.

Another object of the invention is to provide an MPEG-7 query generation tool in which the ordering of the results may be explicitly stated by the user.

Another object of the invention is to provide an MPEG-7 query generation tool that provides a library of functions from which the user may construct a query.

Another object of the invention is to provide an MPEG-7 query generation tool that allows the user to build queries from examples and saved queries.

Another object of the invention is to provide an MPEG-7 query generation tool that allows a query to be defined as a series of related terms so that query variations may be readily built and tested.

Another object of the invention is to provide an MPEG-7 query generation tool that is capable of generalizing user input, to thereby reduce the amount of user input required.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 16 is a text section within an HTML header segment which exemplifies META tag use.

DETAILED DESCRIPTION OF THE INVENTION

Referring more specifically to the drawings, for illustrative purposes the present invention is embodied in the systems and methods generally shown in FIG. 2 through FIG. 16. It will be appreciated that the systems may vary as to configuration and as to details of the elements, and that the methods may vary as to the specific steps and sequence, without departing from the basic concepts as disclosed herein.

Figure 2:
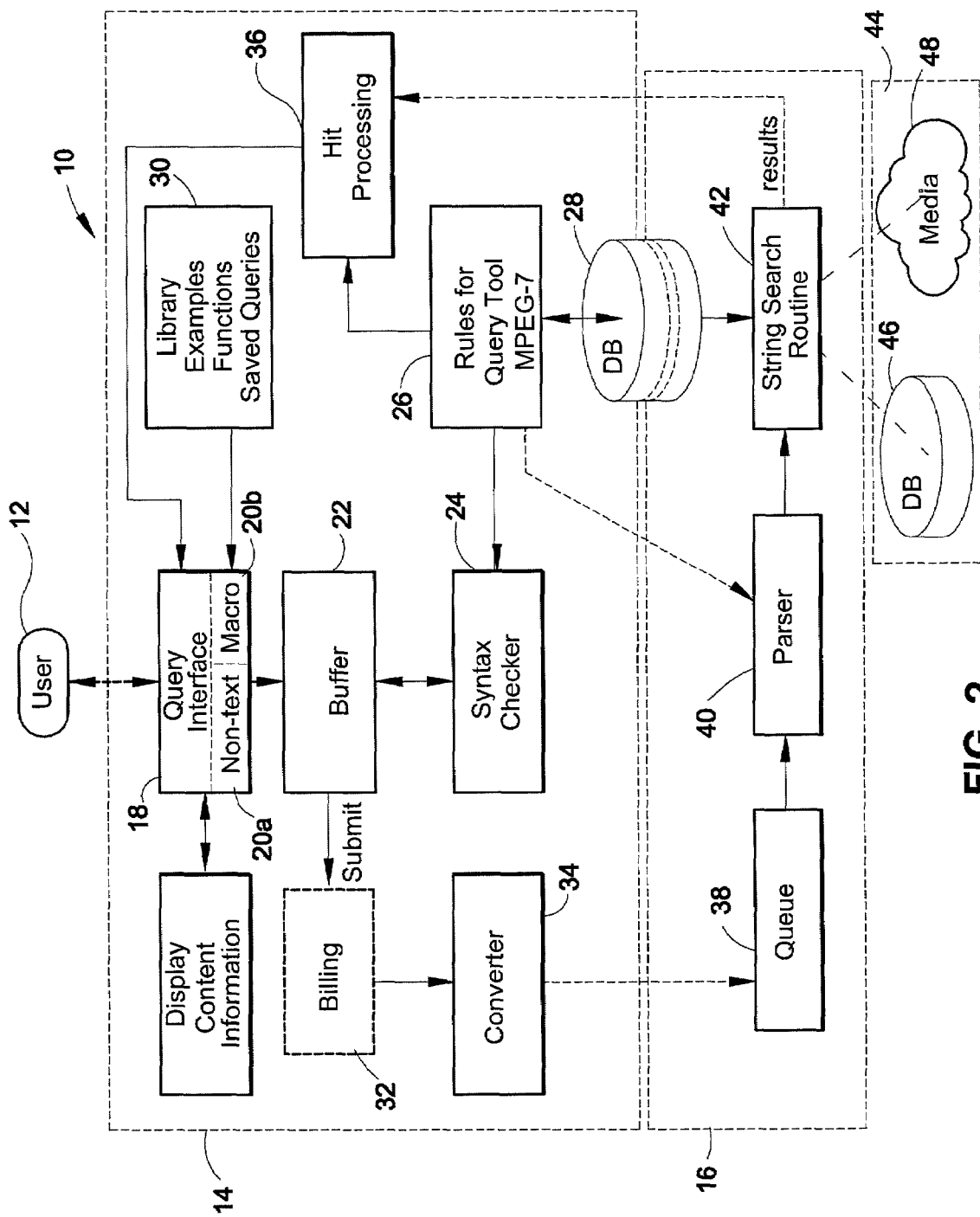
FIG. 2 is a block diagram of an MPEG-7 content searching system according to an embodiment of the present invention, shown with a query generation tool coupled with a search engine.

FIG. 2 is an MPEG-7 content searching system 10 according to the present invention wherein a user 12 interfaces with an MPEG-7 content description query generation tool 14, that is coupled to a search engine 16 configured for MPEG-7 content searches. Communication with user 12 is through a query interface 18 which is preferably configured with a non-textual capture routine 20a, and a macro processing routine 20b. Query interface 18 allows a user to input query information in either text or non-textual formats for the building of a query which is contained within a query buffer 22. It will be appreciated that the user may directly input query information to system 10, or communicate the information to system 10 from a remote location. The syntax of the query being built within query buffer 22 is preferably checked in response to user input, or at the completion of query generation, by a syntax checking routine 24. A rules checking routine 26 extracts relevant rules in relation to both the query tool and underlying MPEG-7 standards by extracting syntactic information from a database 28. Rules checking is utilized during the execution of the syntax check and in related functions. The database 28 may retain myriad forms of information, including: programs, user information, rules, saved queries, user preferences, and keyword lists from associated content. It should be appreciated that although database 28 is shown as a single repository for a number of types of information, it may alternatively comprise multiple databases. A library 30 is preferably provided to facilitate the building of MPEG-7 content description queries by providing access to example queries, query templates, function descriptions, function templates, saved queries, and so forth. Users may build MPEG-7 content description queries directly, or utilize the examples and templates to cut and paste, or fill in the blanks, to build MPEG-7 content enabled queries. After completing the building of a query it is submitted to a search engine. Submission of the query is preferably by way of a billing routine 32 and a query converter routine 34. Billing routine 32 provides for the tracking of various billing metrics according to parameters set by the hosting company; which may include the tracking of time units, utilized resources, subscription rate, actions, combinations thereof, and so forth. Furthermore the system can selectively charge users for only those queries in which the results are utilized, so that users are not penalized for refining a query to a more limited set of responses. Converter routine 34 is preferably utilized to reformat the query from a query generation tool specific syntax into a syntax acceptable to the search engine to which the query is being submitted. Responses may be returned from the search engine through a hit processing routine 36 which is capable of ordering the responses and utilizing various methods of displaying the responses according to user selected preferences. Preferably, results provided by the hit processing routine may be further ordered and refined by the query interface under user direction. It should be appreciated that hit processing routine 36 may be alternatively, or additionally, configured within the search engine itself.

Search engine 16 receives the query into queue 38. The query may then be directly executed or parsed prior to search execution. Utilizing a parser 40 the query is disassembled into a form that is optimized for use by a string search routine 42. An example of optimization can include the creation of parallel term sets from the received query to allow parallel searching within the collected data. Parser 40 is shown utilizing MPEG-7 content description rules from rules checking routine 26, however, it may alternatively receive information about MPEG-7 syntax from other sources. It will be appreciated that the string search routine 42 may alternatively disassemble the query while applying the query to each element of the search, however, such non-parsed searching can be dramatically less efficient than pre-parsed searching. A search engine 16 typically operates on a database of indexed keywords and structures to fulfill the query, since real-time searching of the actual resources would slow search execution. The set of indexed keywords and associated information is generally created by characterizing content containing objects, typically web sites, that have been submitted for inclusion, or that have been found by a spider routine which searches content sources within a given content domain. The content domain whose elements are characterized for use by the search engine typically reside as an external set of content resources 44 which may contain one or more databases 46, or communication media 48 through which a search may be executed, such as over the Internet. Terms parsed from the query are compared during search execution against indexed keywords in the database, and content elements which appropriately match the query terms are agglomerated and returned to user 12.

Figure 3:
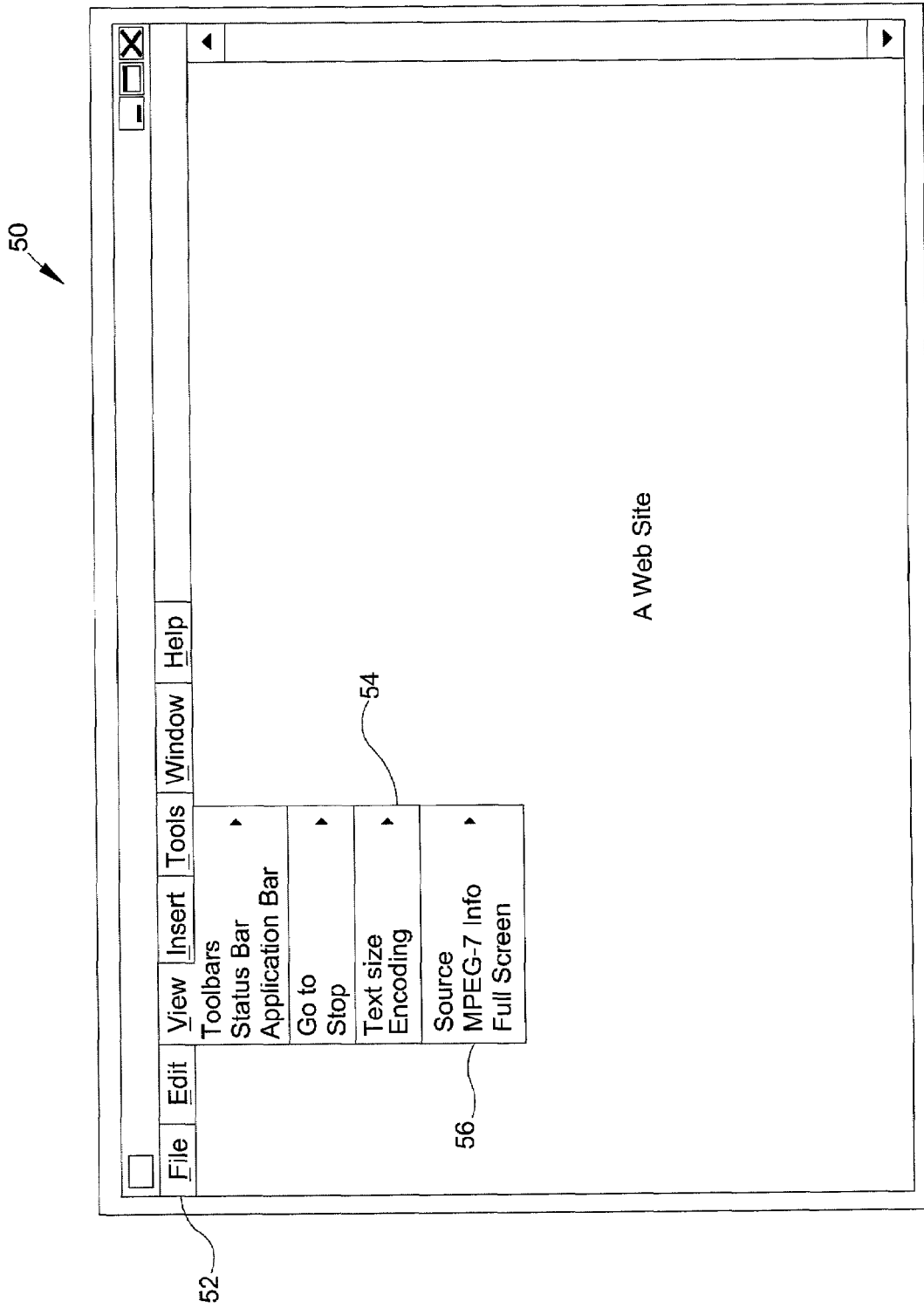
FIG. 3 is a screen for a browser interface according to an aspect of the present invention, shown with a pull-down menu for viewing MPEG-7 content descriptions.

FIG. 3 is an example of a browser interface 50 that is capable of displaying MPEG-7 content information about the document being browsed. A toolbar 52 is configured with a pull-down menu 54 containing an MPEG-7 information selection option 56. Upon selecting MPEG-7 information 56, the user can preferably view MPEG-7 content information for content elements located on the page, according to mouse focus, or elements available within a broader context, such as upon the entire referenced website. According to user selected preferences, the MPEG-7 content information can be expanded to any desired level with embedded context and descriptions to enhance readability.

Figure 4:
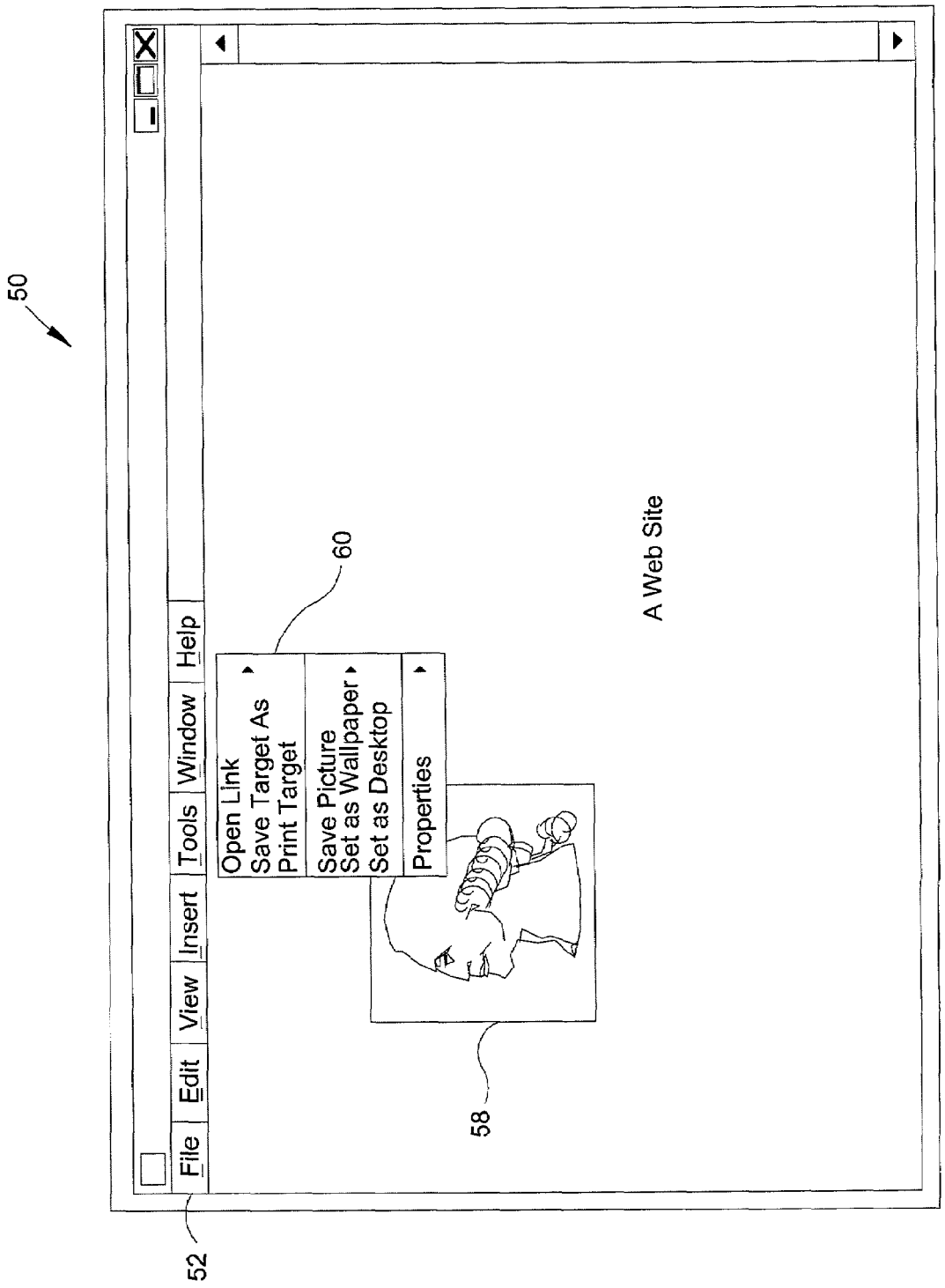
FIG. 4 is a screen from a browser interface shown with an option menu associated with a selected content element.

FIG. 4 is a browser interface 50 configured to display content information about a selected content element, whose graphic, or link is being displayed on a web page. This is shown by way of a conventional menu typically obtained by executing a secondary mouse click, typically by activating the right hand key on the mouse when a content object 58, or link, has cursor focus. The option menu 60 pops up and displays a "properties" menu item, or similar, such as shown at the bottom of the list.

Figure 5:
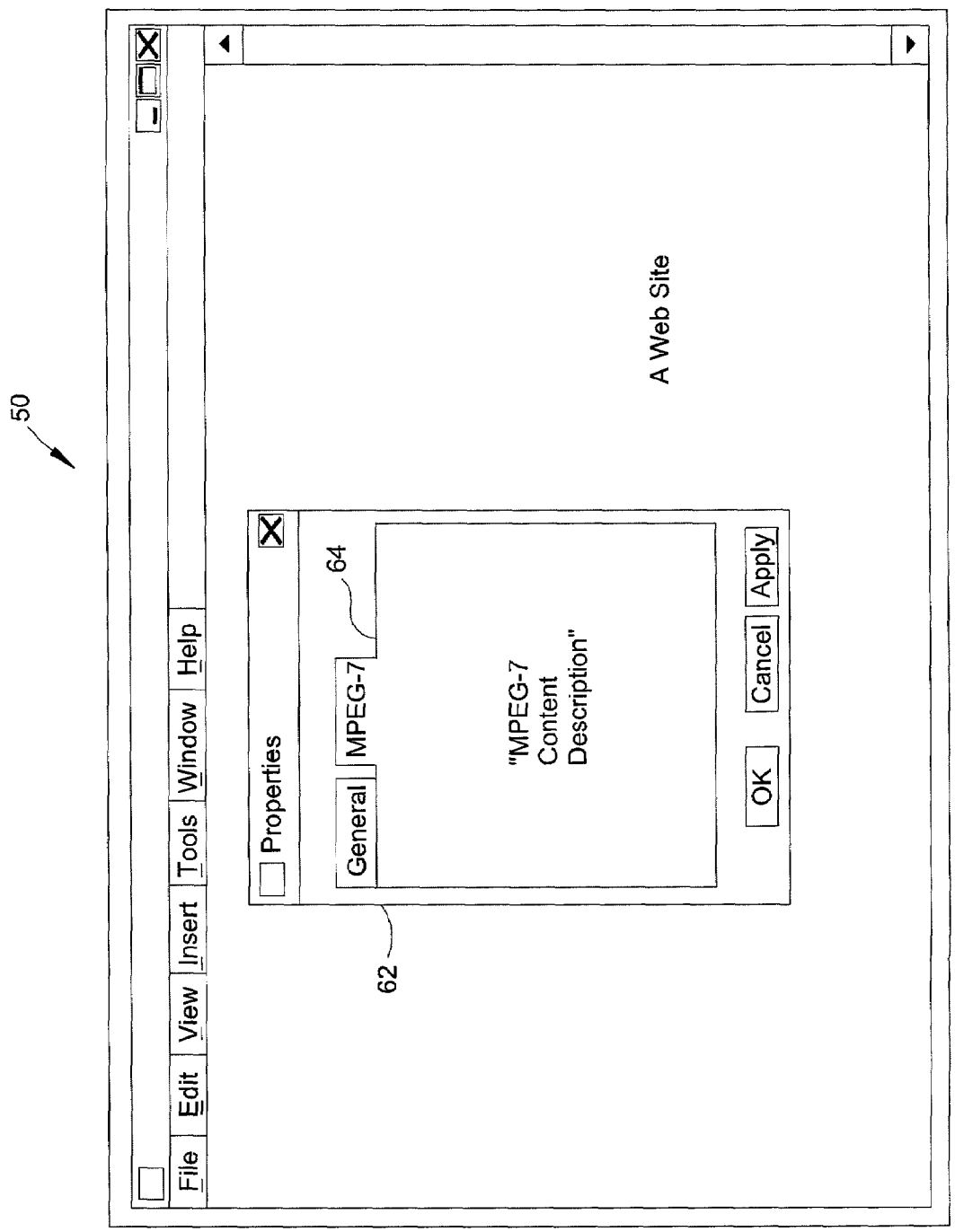
FIG. 5 is a screen from the browser of FIG. 4, configured according to an aspect of the present invention for providing MPEG-7 information about the selected content element.

FIG. 5 is a display window 50 which opens upon selecting "properties" from the option menu of FIG. 4. A property information window 62 is shown configured according to the present invention to allow for the selective display of general properties or MPEG-7 properties 64. Selection of the digital material object is preferably determined by containment, focus, linking, association, or direct selection, such as cursor selection, from the display window or associated hosting application. Although the MPEG-7 display screen is shown blank, it will be appreciated that any content that may be described according to the MPEG-7 content descriptions may be displayed therein. The display of MPEG-7 content information is preferably augmented, either automatically, or through user selection, to interpret the syntax of MPEG-7 into enlarged content descriptions which are more easily readable by the user. The display window 50 may be contained within a browser, or a web site, such as a web site that includes a frame within which other webs sites and content-laden materials may be accessed.

Figure 6:
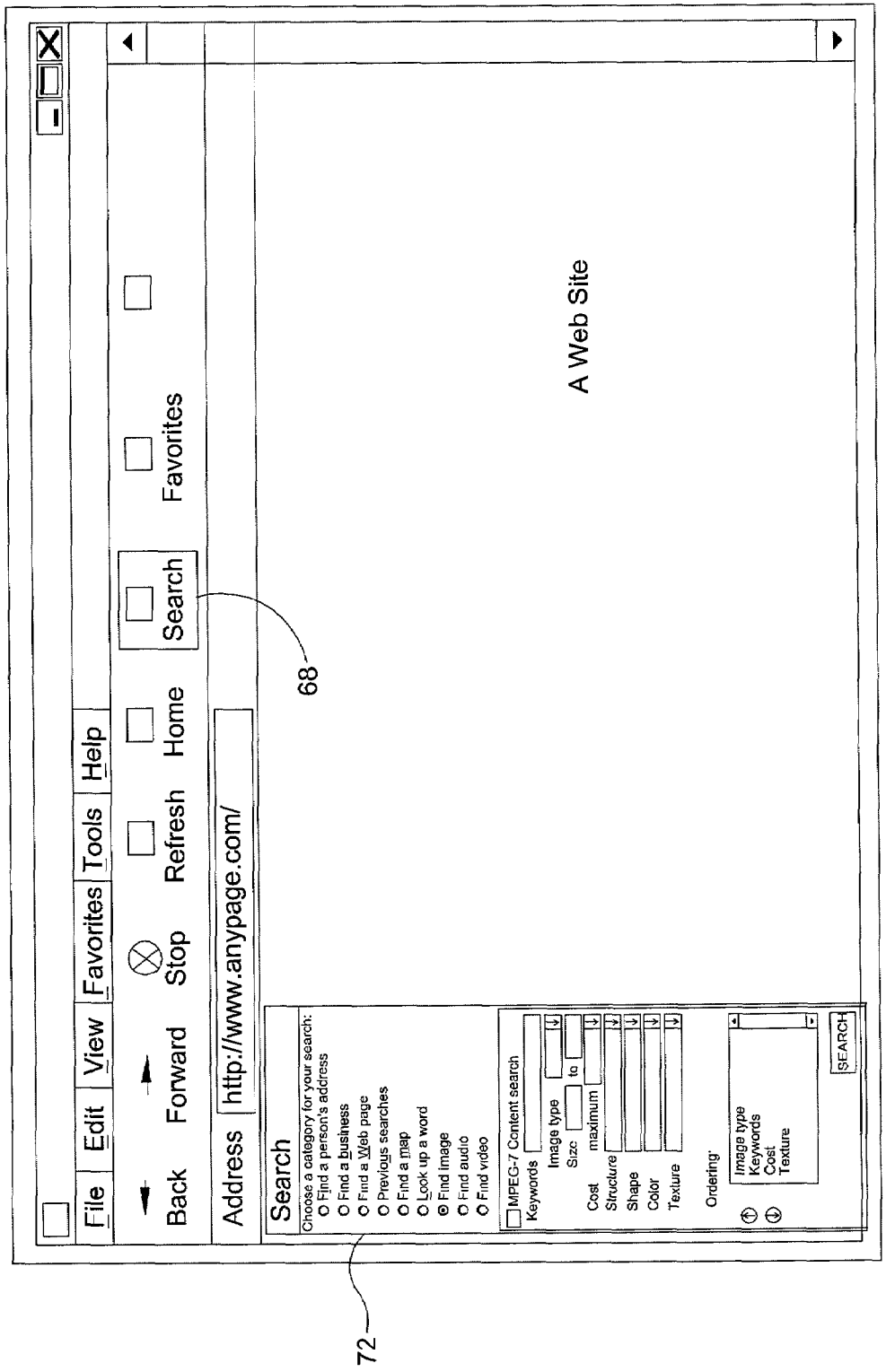
FIG. 6 is a screen for a browser interface according to an aspect of the present invention, shown having a search screen in which MPEG-7 content descriptions may be entered.

FIG. 6 depicts a search icon 68 being clicked within a browser interface 70 configured for searching a collection of content, or database derived therefrom, based on embedded MPEG-7 content descriptions. Search icon 68 opens search menu 72 to allow the user to enter information about the search that is to be performed. To simplify user training, the search menu depicted is an extension of a conventional search menu that has been configured according to the present invention to allow for the entry of MPEG-7 content descriptions to be utilized within the search.

Figure 1:
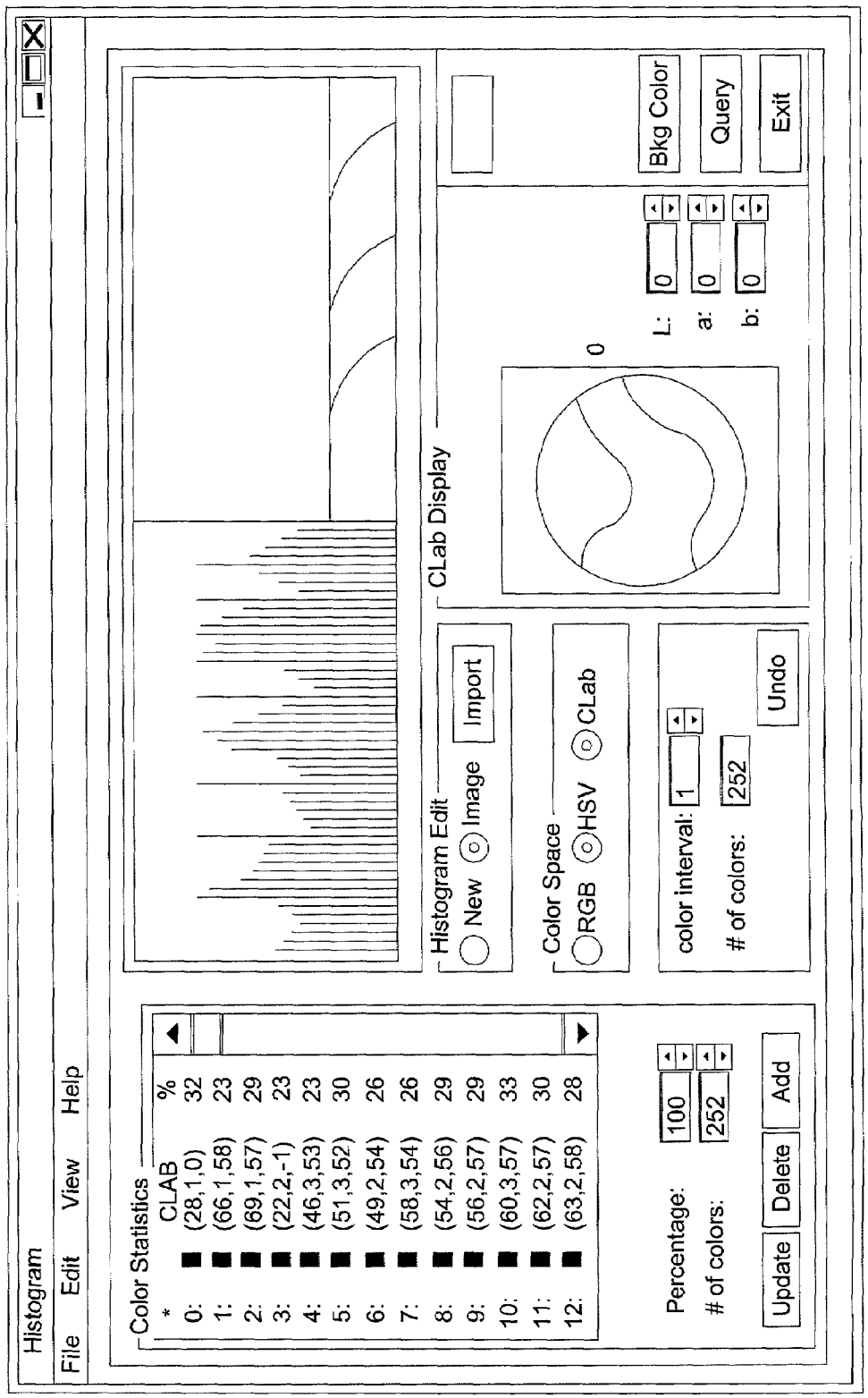
FIG. 1 is a conventional color histogram generated for a multimedia image, which exemplifies non-textual color information as may be characterized within an MPEG-7 content description.
Figure 7:
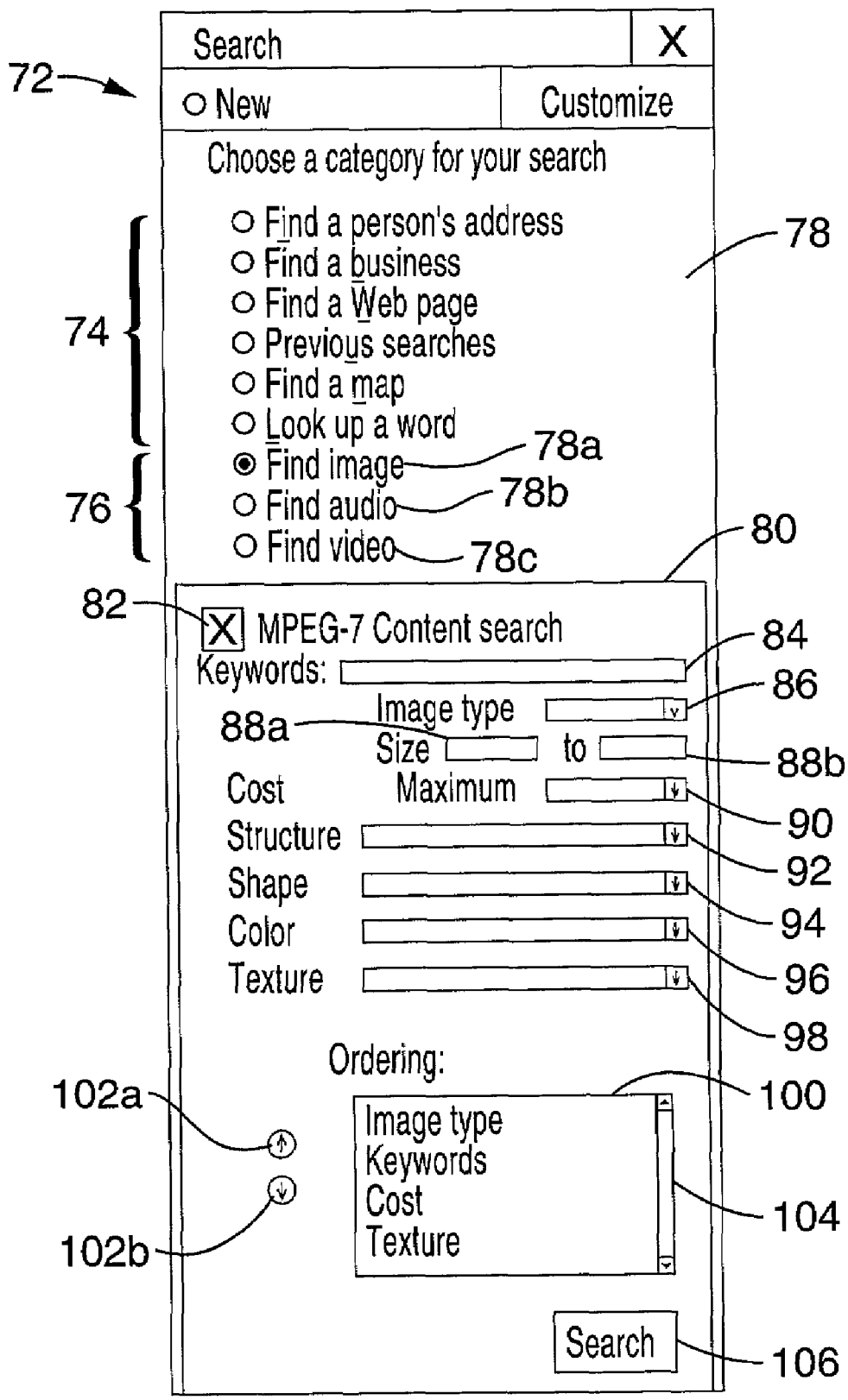
FIG. 7 is a detailed view of the search screen of FIG. 6, which exemplifies fields for selecting multimedia content based on MPEG-7 content.

Referring now to FIG. 7, various radio buttons on search menu 72 interface are shown, for example those associated with conventional text based searches 74, and multimedia styles of content 76 which comprise images 78a, audio 78b, and video 78c. A content type subwindow 80 has been opened according to the image content 78a and further in accordance with activation of an MPEG-7 content description check box 82. Within subwindow 80, the user can specify the search terms and characteristics which are to be met by the target content. The search terms in subwindow 80, are shown by way of example as the following set of fields. A keyword field 84 provides content related keyword entry. An image type field 86 allows specifying the type of content being sought. A size range selection 88a, 88b allows the specification of minimum and maximum size ranges. A cost factor field 90 allows the user to set the limits on pricing for the content being sought. A structure field 92 allows input of structural references. A shape field 94 allows the user to input one or more shape characteristics. A color field 96 can accept user input describing colors, while a texture field 98 can accept information about the texture of the image sought. A term ordering window 100 allows the user to select the priority of description fields to which search responses are to be ordered. Term ordering window 100 contains a term ascend button 102a, and term descend button 102b, so that the user can reorder a selected term within a prospective search, while a scroll bar 104 provides display area scrolling. The parameter types, such as shape, color, and the like, may be themselves selected within a drop down list (or similar input mechanism) so that the user may select the type of parameter and then instantiate that type of parameter in a succeeding field. For example, selecting the parameter type "color" from a first drop down list; and then instantiating the color choice in a second drop down list as "mostly blue", "desert hues", or through the use of entering a color selection histogram. It should be appreciated that a boundless variety of MPEG-7 related fields may be additionally, or alternatively, utilized within the search window and that each of these fields may be expanded to menus or other input means upon selection. For example, upon selecting a histogramming entry within the color field, the field preferably opens to a histogramming screen similar to FIG. 1 for capturing user specified color parameters. Furthermore, it should be appreciated that any fields conforming to MPEG-7 content descriptions, or from which MPEG-7 content descriptions can be associated, may be utilized according to the present invention as fields within the set of search parameters. A submit button 106 for the search query is activated by the user pursuant to entry of all desired MPEG-7 search parameters, wherein the search commences and thereafter matches are returned to the user.

Figure 8:
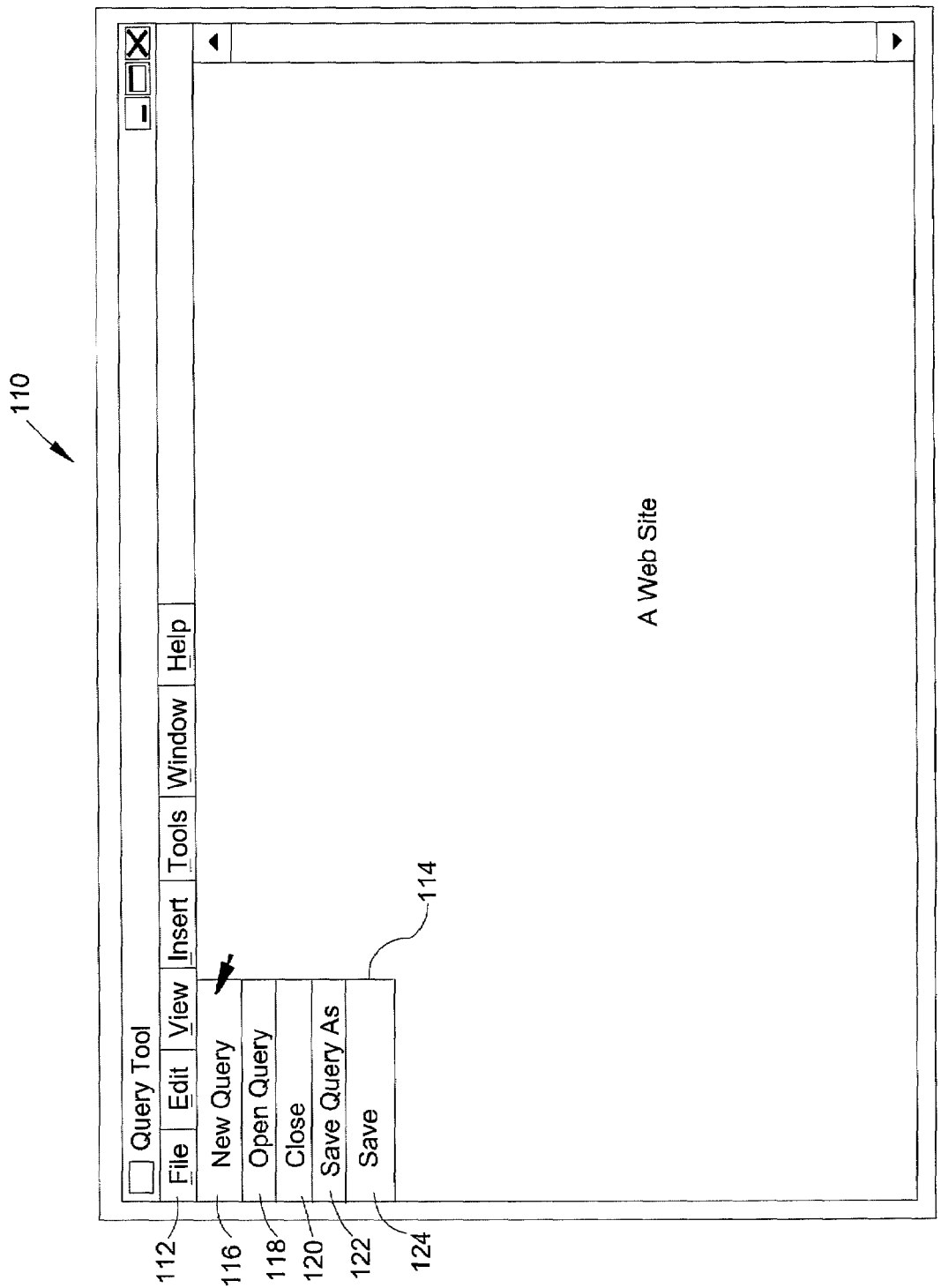
FIG. 8 is a screen for an MPEG-7 query generation tool interface according to an aspect of the present invention, shown with a query file pull down menu upon which a new query is being selected.

FIG. 8 is an MPEG-7 query generation tool interface page 110 within which a user may create new MPEG-7 content description queries and open existing queries. It will be appreciated that the query generation tool according to the invention may be hosted as a separate application, either upon the host machine or by way of an ASP or similar third party application hosting environment, or integrated with other applications to provide MPEG-7 content description query generation and search submission. A tool bar 112 is shown from which a pull down menu 114 has been selected containing menu entries comprising, "New query" 116, "Open query" 118, "Close" 120, "Save query as" 122, and "Save" 124. For simplicity, these menu items are configured to operate in similar manner to file opening and closing as found in a conventional word processing program, such that new queries may be opened, existing queries viewed or modified, and resulting queries saved.

Figure 9:
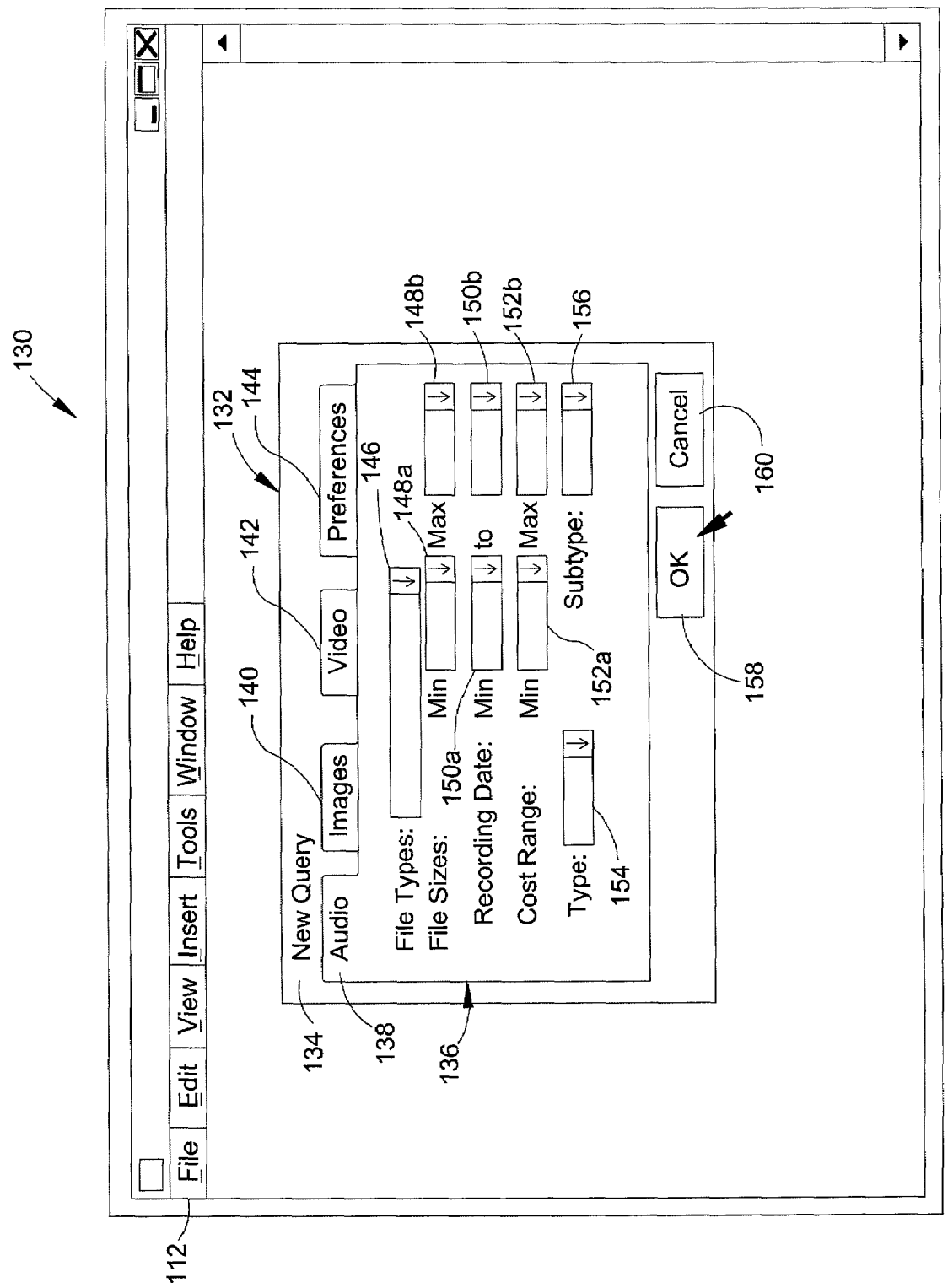
FIG. 9 is a screen for an MPEG-7 query generation tool interface as depicted in FIG. 8, shown with high level search definition fields for a new MPEG-7 content description query.

FIG. 9 is an MPEG-7 query generation tool interface page 130 shown by way of example for opening a new MPEG-7 content description query. A query limitation menu 132 is exemplified opened up for the new query so that basic information may be entered to limit the search. Query limitation menu 132 may contain a named query whose title is reflected in the title bar 134. A selection area 136 is shown divided into audio 138, images 140, video 142, and a preferences tab 144 that allows the setting of user preferences for this particular search. It is preferable that the user is allowed to set a default list of preferences which apply to all queries and is subject to being overridden by the preferences selection tab 144. A set of fields are exemplified within selection area 136. A file type field 146 allows selection of which file formats should be included within the search. Multiple entries may be selected within the drop down list field shown so that a number of content types may be simultaneously searched for. File size ranges 148a, 148b allow specifying size ranges, and it should be appreciated that "size" may be specified in relation to the type of content, and can comprise file sizes, duration (audio and video clips), image size in pixels, and so forth. A recording date range 150*a*, 150*b* specifies limits on when the content was recorded. A cost range 152*a*, 152*b* allows the user to select multimedia content according to preset cost criterion. Fields for receiving content type 154 and subtype 156 parameters are also shown by way of example. These fields allow the user to specify categories of content; for instance for an audio file the type may be entered as "Jazz", whereas the subtype may be entered as "New Orleans". It will be appreciated that the fields represented are shown by way of example and that various fields may be utilized that are associated with the content element or the MPEG-7 content descriptions. A number of the fields shown, such as file type, are conventional selection criterion which can be entered by the user to provide high level selection criterion under which more specific MPEG-7 content description query elements may be received. Pursuant to entering content selection criteria, a continuation button 158 may be activated to continue with query information entry, or a cancel button 160 may be activated to abort the new query.

Figure 10:
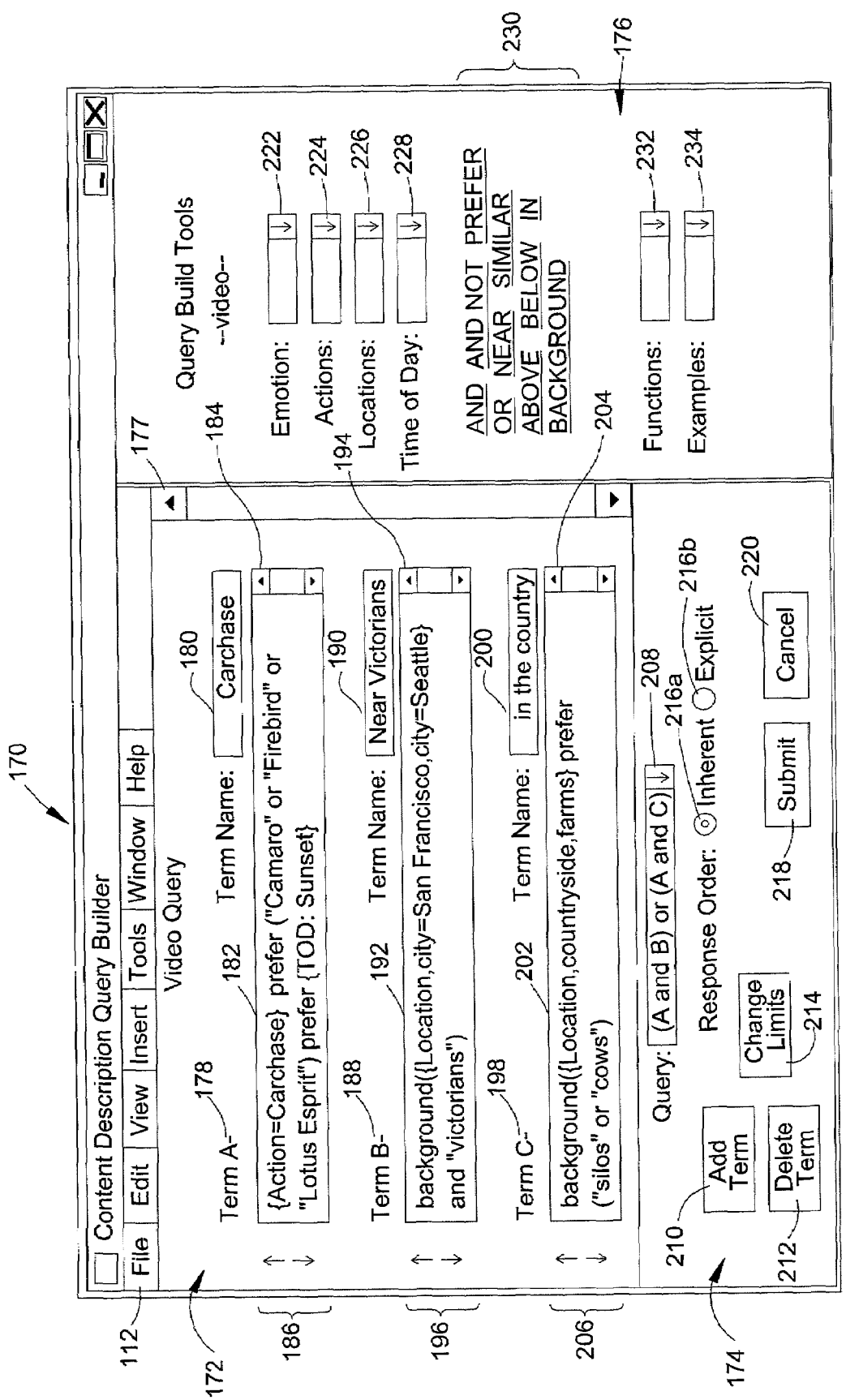
FIG. 10 is a screen for an MPEG-7 query generation tool interface according to an aspect of the present invention, shown with an MPEG-7 content description query building screen.

FIG. 10 exemplifies an MPEG-7 query generation tool interface page 170 for building MPEG-7 content description queries. Interface page 170 is shown configured for multi-term advanced queries, although the user default is preferably set for the entry of single term queries. A term definition area 172 is shown within which the query is to be built. A query control section 174 provides overall query control, response ordering, and query submission control. A set of query building tools 176 is shown which provides a number of query building aids for the user. Definition area 172 contains a scroll bar 177 to provide access to all terms in case of lengthy queries. The exemplified screen allows the query to be built from subquery terms that may be utilized in a variety of ways when testing and refining the query while minimizing the amount of rewriting of query text. Query term "A" 178 can be described by a descriptive name field 180 and it can receive a series of query elements within a query element entry field 182. Although MPEG-7 query elements according to the invention may be input in other than text form, such as histograms, sketches, and related images, each form is reduced to text prior to searching for MPEG-7 content. Query element entry field 182 may be scrolled utilizing a set of scroll bars 184 such that a long series of query elements may be entered. In addition, a set of term ordering ascend and descend controls 186 are provided so that selected elements of the query term may be moved forward or backward within the query text, so as to affix a relative priority therein. Similar information is provided for a term "B" 188 with a descriptive name 190, a query element entry field 192, scroll bars 194, and a set of term ordering controls 196. Likewise, term "C" 198 is configured with a descriptive name 200, a query element entry field 202, a set of scroll bars 204, and a set of term ordering controls 206. Any number of terms may be added into the complex multi-term query. The terms are connected in the multi-term query utilizing a query statement field 208 which relates the terms for submission within the query and can also accept separate query elements not associated with term entry fields "Term A", "Term B", and so forth. It will be appreciated that a number of query tests, and variations may be performed by altering the use of the various query terms without the necessity of rewriting the query elements within the terms. The user may enter various possible criteria and then construct queries utilizing these elements within the query statement field 208 for submission to the search engine. To change the number of terms provided, an add term button 210 and delete term button 212, are preferably provided. The higher level limits of the search, as shown in FIG. 8, may be altered readily by selecting a change limits button 214. Response ordering is shown being selected by a pair of radio buttons so that the user can select an "inherent" response order 216*a*, or set an "explicit" response order 216*b*. Inherent response ordering utilizes the ordering of the terms within the query statement field and respective query element entry fields to determine response ordering, while explicit response ordering is determined by the entry of a separate input, such as a boolean text string. User selection of "explicit" response ordering preferable results in the opening of a field, or alternatively a menu or other input structure, configured for receiving user ordering criteria. It should be appreciated that in using explicit ordering of responses, the ordering terms need not match any of the selection terms, wherein the user can specify new criterion for ordering such that the search is limited by the search terms and ordered by the ordering terms keyed to a different set of content characteristics. Pursuant to query creation, the query may be submitted by activating a submit button 218, or canceled by activating a cancel button 220.

A set of query building tools 176 are preferably provided within the query generation tool so that users may readily create useful MPEG-7 content description queries for selecting content. Query building tools preferably comprise a library of functions, queries, templates, and examples from which queries may be created by selection, copying, analogy, cut and paste, and so forth. In addition, the query building tools provide a mechanism whereby a complex set of query terms may be generalized to reduce user entry requirements. For example, a complex description for an action sequence could involve a large series of terms that can be shortened by the query building tools into a single statement. In term "A" 182 the element "{Action=car chase}" is a functional description selected from the query build tool that can result in a complex series of query terms as sent to the search engine. By utilizing these functional macros, the user can more readily create a query without the need of requiring homologous function and term use within the series of search engines receptive of MPEG-7 queries. A set of these term building fields is exemplified by an emotion field 222, an action field 224, a location field 226, and a time of day field 228. A set of commonly utilized "quick pick" operators are contained within an operator list 230. Query functions may be selected from within a drop down list 232 that preferably expands into a menu for the entry or definition of complex functions. The user may also draw from a set of example queries contained in an example selection field 234. It will be appreciated that the query building screen described above is provided by way of example and may be implemented with myriad variation without departing from the MPEG-7 content description based searching as taught herein.

Figure 11:
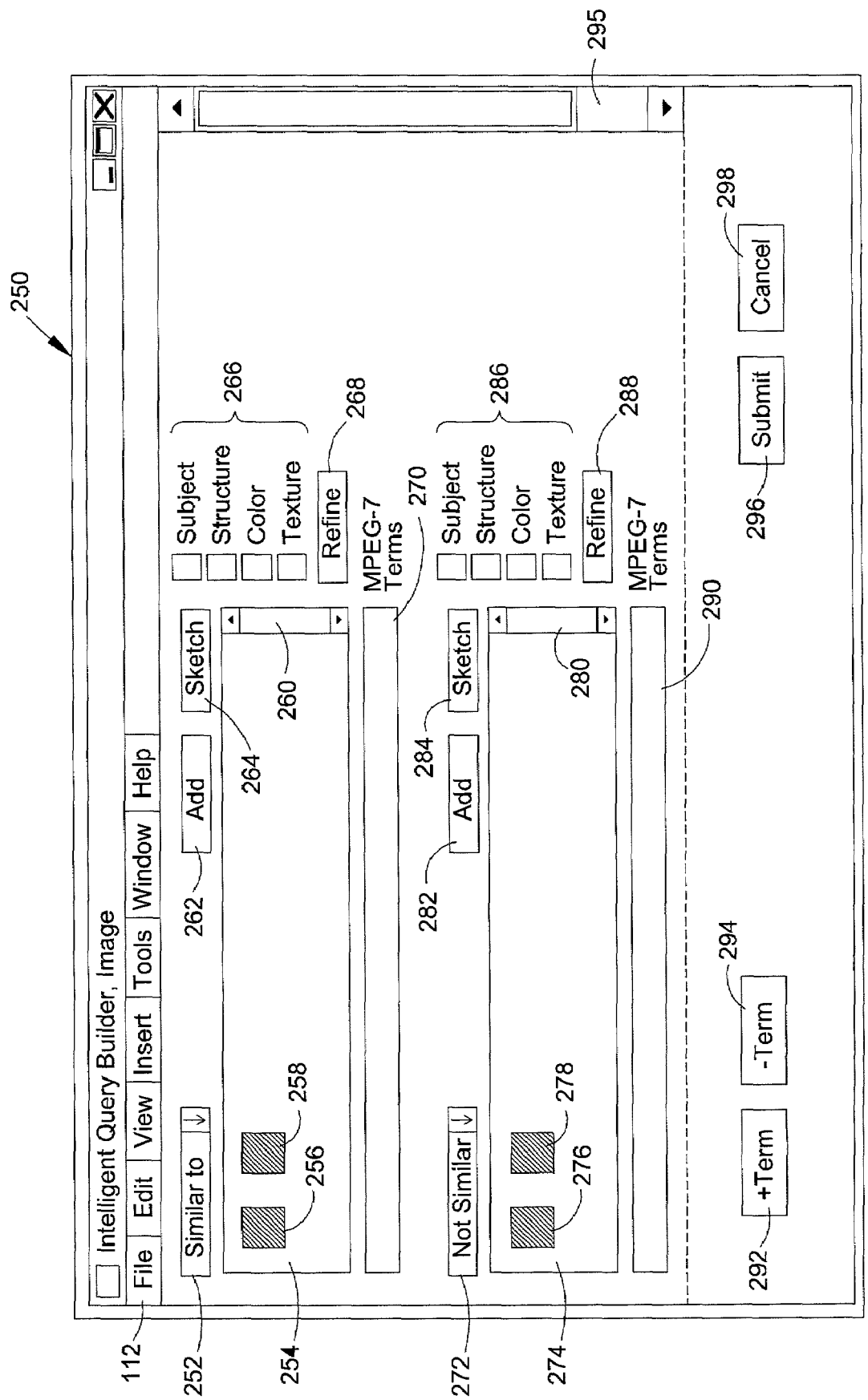
FIG. 11 is a screen for an MPEG-7 query generation tool according to an aspect of the present invention, shown for providing intelligent query generation based on samples and relationships that constrain the search upon which the query is built.

FIG. 11 is an MPEG-7 query generation tool page 250 for generating intelligent queries according to an aspect of the present invention. Intelligent query generation draws inferences from elements provided by the user, preferably augmented with other user input, to readily generate, or refine, MPEG-7 queries. Intelligent query generation may be utilized separately or in conjunction with other forms of query generation tools, such as the aforementioned multi-term query, for generating or refining query terms. The exemplified page 250 utilizes content entries provided by the user in concert with specified relationships, such as "similar" or "dissimilar", to constrain the search upon which the MPEG-7 query is built. The relationship is selected by a drop down list comprising a relationship field 252, shown with a relationship of "similar to". A sample area 254 is provided in which the user can enter content, shown as thumbnail prints, or content links which provide content having the specified relationship associated with their respective MPEG-7 content descriptions to the content being sought. Two blocks of content are shown as sample "A" 256, and sample "B" 258. A scroll bar 260 allows moving within the sample window as it can preferably contain a large number of samples, inclusive of selected results that were returned from prior searches. An "Add" button 262 allows adding elements, such as files, to the sample window. Samples being displayed may be deleted in a number of ways, such as by cursor selection followed by pressing the delete key. Activation of a "Sketch" button 264 on the page opens a sketch entry screen (not shown) that captures a user sketch of an MPEG-7 description field, such as structure, which is being sought. The "Sketch" button, per se, is provided according to the image content desired. It will be appreciated, however, that in searching for alternative content a variety of other forms of non-textual input can be collected from the user. For example, when searching for audio content, user input can be solicited in the form of audio sounds to a microphone, such as the humming of a melody similar to that being sought. A set of parameter characteristics 266 are provided to define the characteristics of the related samples which are of interest; by way of example, an image may be described in various terms including subject, structures, colors, relationships, textures, and so forth. A "Refine" button 268 can be utilized to open a comprehensive characterization screen (not shown) in which the characteristics of interest within the samples are more fully refined by the user. The characterization refinement screen may be implemented in a variety of ways, including the use of an intelligent interrogative session wherein the user answers questions formulated in response to the sample, selected characteristics, and previous answers so that a tightly focused query may be generated. A query terms window 270 preferably displays the query terms which have been generated for the samples having the given relationship with the content sought, and directed by the characterization information and refinement operations. A second term area contains a relationship field 272, in which "NOT similar to" has been selected by way of example in relation to the sample window 274, and included sample "C" 276 and sample "D" 278. It will be appreciated that if samples "A" and "B" depicted images of trees, while sample "C" depicted a spider web and sample "D" a shrubbery, that the user would appear to be searching for a tree-structured image having an upward divergence from a single trunk. The second term area also comprises a scroll bar 280, "Add" button 282, "Sketch" button 284, parameter characteristics 286, "Refine" button 288 and a query terms window 290. The number of sample groupings may be expanded by activating an "Add term" button 292 and reduced by activating a "Delete term" button 294 when cursor focus is located on a term to be deleted. Manipulation of a large number of sample groupings is facilitated by a scroll bar 295 which allows viewing of any of the sample groups. A generated query may be submitted to the search engine by activating a "Submit" button 296, or cancelled by activating a "Cancel" button 298.

Figure 12:
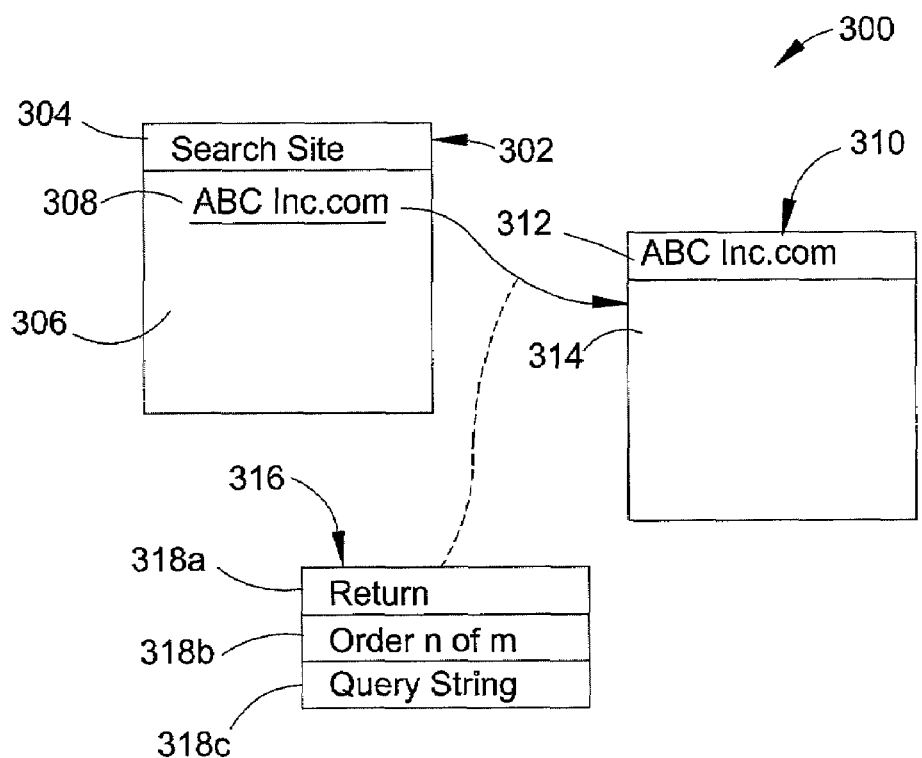
FIG. 12 is a data flow diagram of a query capture mechanism according to an aspect of the present invention, shown transitioning from a link in a set of search returns to a web page that is provided with information.

FIG. 12 is a screen flowchart of a query capture service 300 for providing a vendor with information about the query which was utilized to arrive at the vendor web site. It will be appreciated that users often arrive at a vendor web site as a result of a search procedure, however, the web site and associated programming being executed is only cognizant of the fact that a user has arrived at the site. Any information, therefore, that the vendor desires about the current user must be actively collected from the user, such as by having the user fill out a survey. It will be appreciated that users are not inclined to utilize their time filling out a survey for the benefit of the vendors. Vendors, as a result, often have difficulty in collecting accurate information that would aid them in characterizing the search strings and other mechanisms by which the prospective customers have arrived at their site. The query capture service of the present invention provides information to the web site of the vendor in response to the query and search results that have led the user to the vendor site. A search site 302 is shown with title 304 and page content 306 containing search results that include vendor link 308. After activating vendor link 308, the user arrives at vendor (destination) web page 310 containing title 312 and web content 314. The vendor web page 310 is also passed query information, such as by passing a link to a structure 316 containing a return link 318a, link order parameter 318b (position of the vendor in the search results, i.e. "13 of 345"), and information about the submitted query string 318c, which may be inclusive of the query string in its entirety. The software within the vendor site can thereby utilize the received information to compile information about users visiting their site, and respective user needs as identified by the search strings utilized to arrive at the search site. The embedded return link may be adapted as a unique link for the given query so that programming executable on the destination site can extract further information from a more detailed search data structure or from a search activity log in relation to the specific query, and additional related queries performed at the time of the search. This additional information could be made available in exchange for remuneration from the organization associated with the destination web site. It will be appreciated that in response to this additional information, the embedded META tags, MPEG-7 content descriptions, and other search related keys associated with, or embedded within, the web site pages may be altered or enhanced to improve the relevance of the web site during searches. For example, additional search terms utilized by a user arriving at the site can be incorporated into the META tags, so that additional prospects may be directed to the site by means of those or similar keys.

Figure 13:
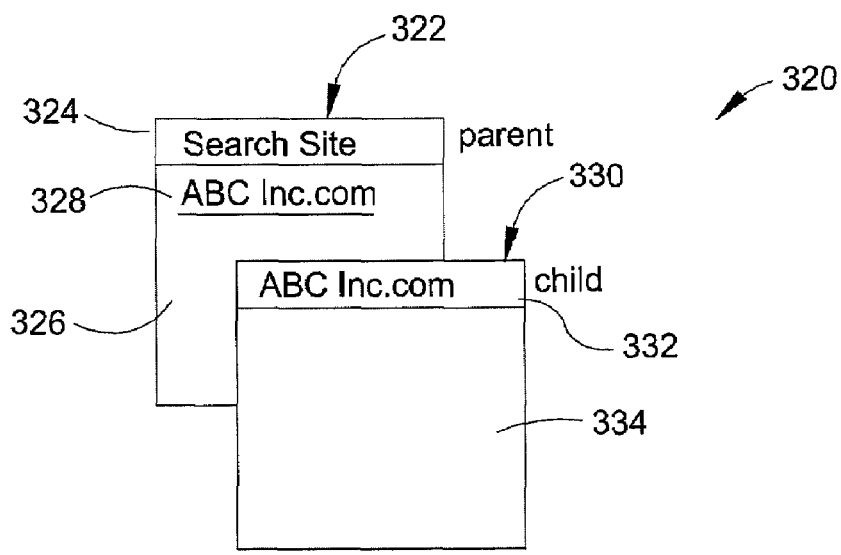
FIG. 13 is a data flow diagram of a query capture mechanism according to an aspect of the present invention, shown transitioning from a link in a set of search returns to a web page which can access query information from the parent web page.

FIG. 13 is a screen flowchart of an alternative query capture service 320 wherein the search site is a parent site 322 with title 324, page content 326, and link 328 which represents the aforementioned query information within a structure accessible to the child screen 330 which contains the vendor web site with title 332 and page content 334. The vendor web site is capable, therefore, of accessing the query information within the parent data structure to gather information about the search, which brought in the prospective customer.

Accordingly, it will be seen that this invention provides systems and methods for gathering information about content, the generation of MPEG-7 content description queries, the execution of MPEG-7 content description searches, and the collection of user search information upon arrival at a destination web site. The present system has been exemplified by way of block diagrams and screens in order that aspects of the invention be illustrated, however, it is to be appreciated that the implementation of the teachings contained herein are subject to variation without departing from said teaching. In particular, the screen structures and fields may be organized in a variety of ways and include any of numerous fields and field forms. A person of ordinary skill in the art being capable, therefore, of adapting the structures and screens shown into myriad variations without creative efforts and therefore without departing from the teachings herein.

Figure 14:
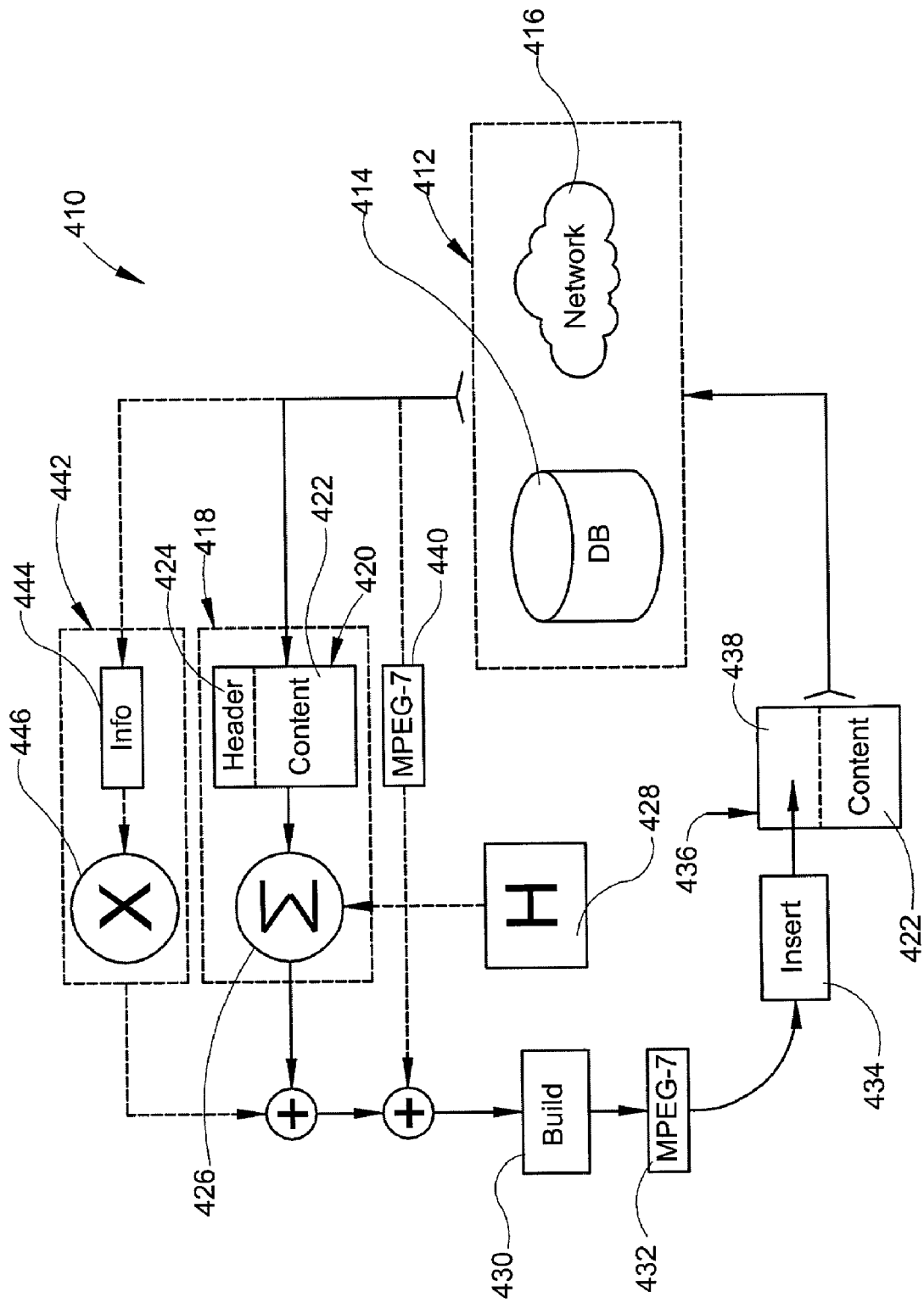
FIG. 14 is a schematic of a system which embeds MPEG-7 content descriptions within a digital material object, shown for use with content and information repositories comprising either local databases or network derived resources.
Figure 15:
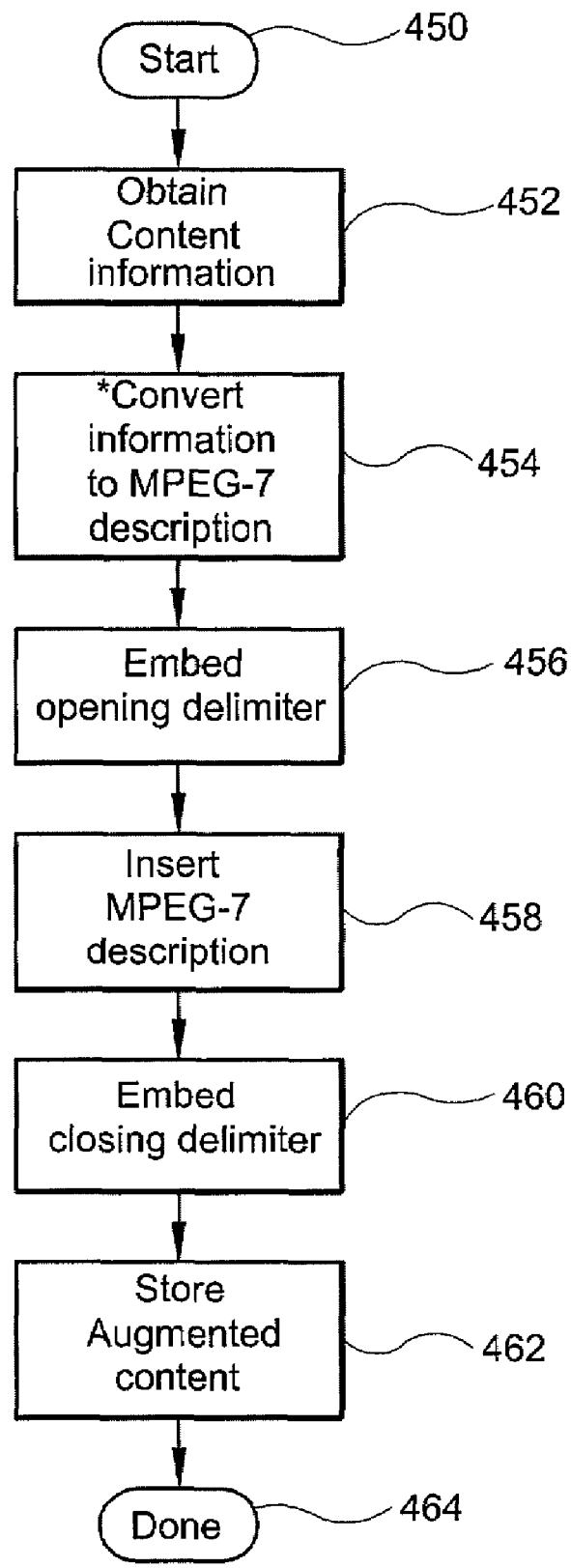
FIG. 15 is a flowchart of a process for embedding the content descriptions within a digital material object.

FIG. 14 through FIG. 16 describe by way of example, a system and method of embedding the MPEG-7 content description within a header of a content laden file. It will be appreciated that the aforementioned systems and methods for embodiments for utilizing content descriptions may be configured for various alternative mechanisms for the retention of MPEG-7 content information within a digital material object.

FIG. 14 illustrates a system 410 for embedding MPEG-7 content descriptions within the headers of digital material objects so that later utilization of augmented content may be performed with more speed and accuracy. Content may be retrieved from a variety of source repositories 412 which include remote and local databases 414 and network based resources 416 such as servers connected to the internet. Information which characterizes the content may be provided by the same source repository 412, retrieved from a third party, or performed by a characterization routine 418. A digital material object 420 is shown comprising content 422 and a header 424 that may ascribe to any of various formats including SGML and other markup languages, along with subsets of SGML such as HTML, XML, and WAP. Digital material object 420 may be characterized within routine 418 that performs summarizing 426 of the content, for example the color based histograms, size, type, and other information as may be extracted from the content. Additional characterization data may be optionally derived from human intervention 428, wherein an operator can enter characterization data based on more subjective criteria about the content object, such as genre, theme, and classification. The characterization information is preferably generated directly into an MPEG-7 description for use by an embeddable description building routine 430 which creates an insertable META tag description 432 which is then inserted by an insertion routine 434 within the digital material object to create a new digital material object 436 augmented with MPEG-7 content descriptions within the enlarged header 438, while maintaining identical content 422. It will be appreciated that information about digital material object 420 may be fully or partially obtained from a database 414 or via a network 416 for use within the system and may be obtained in a variety of formats. The information may additionally, or alternatively, be received in an MPEG-7 format 440 whereupon it may be utilized separately, or in combination with other information for use by the embeddable description building routine 430 into a resultant MPEG-7 content description 432 that is then inserted by insertion routine 434 into the digital material object 436. Content information may be additionally, or alternatively, received in various other formats requiring manipulation by a conversion routine 442. Information which is provided in a format that is not compliant with MPEG-7, exemplified as information 444, is passed through a converter routine 446 which interprets the content, often utilizing mapping information which associates the content received to MPEG-7 format, wherein the conversion is performed and the resultant MPEG-7 information is used solely or in combination with other information by the embeddable description building routine 430 to create the MPEG-7 content description 432 which is inserted by insertion routine 434 into header 438 of digital material object 436. The resultant digital material object augmented with content information, is ready to be utilized within searches and is shown being deposited back to a repository 412 that may comprise remote or local databases 414 and internet resources 416; which need not comprise the same resources as that which supplied digital material object 420.

It is anticipated that content providers utilizing the system to augment existing content with MPEG-7 content descriptions would typically perform off-line conversion processes on the database in-toto, thereby reducing issues relating to mixed versions and maintenance. The entire content repository would thereby be converted to add the new content information prior to the database being brought up, or restored, to active on-line status. It will be appreciated, however, that incremental augmentation of content descriptions may be utilized. The system has been described in relation to selected applications, however, it should be appreciated that it may be alternatively utilized by various entities for a number of applications which facilitate content searches and management.

FIG. 15 illustrates the general process of embedding the MPEG-7 content information within a digital material object. The process commences at block 450 and information is obtained at block 452 about the content laden object. The aforementioned methods of receiving and characterizing may be utilized in combination or separately to build content information to the desired degree of comprehensiveness. It will be appreciated that information from a number of sources can be agglomerated in building content information. Any information which was received that is not MPEG-7 compliant is converted at block 454 to MPEG-7 format. The content object is then modified starting at block 456 with the insertion of opening delimiters including META tag name, after which the MPEG-7 content description (in however many layers are required to describe the object) is inserted at block 458, followed by embedding of the closing delimiter 460. The new augmented object is then stored as per block 462 as a target for subsequent enhanced searching, whereupon the process is completed at block 464.

FIG. 16 is a listing of a portion of an HTML header containing META tags and exemplifying the insertion point of the MPEG-7 content descriptions within the header information of the digital material object. It will be appreciated that the META names may be altered, and the structure modified without departing from the present invention. A "META NAME" for the embedded content description was selected as "MPEG7Unit" which is followed by the MPEG-7 content description. Portions of additional header elements are exemplified by the META tag "Robot", while the termination of the header is shown by the transition from a "</HEAD>" to a "<BODY>" which contains the web page. It will be appreciated that the MPEG-7 content descriptions may be inserted as a META tag within various document formats which contain headers, including machine-to-man browser entities, such as the aforementioned web page; and machine-to-machine transaction sessions that are established through the use of a headered entity. In either case, the META tag MPEG-7 content information may be utilized directly or through programmatic means to increase the speed and accuracy of searching content contained therein.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for selecting digital material objects containing MPEG-7 content descriptions, comprising:
    means for generating MPEG-7 content description queries in response to information entered about the digital material objects being sought; and
    means for searching a collection of digital material objects which contain embedded MPEG-7 content descriptions in response to queries received from said means for query generation;
    wherein elements of the embedded MPEG-7 content description within searched digital material objects are compared against portions of the MPEG-7 content description query and resulting matches are selected for return.

2. A system as recited in claim 1, wherein said means for generating MPEG-7 content description queries comprises:
    a computer; and
    programming executable on said computer for carrying out the operations of capturing user input within a buffer and converting said user input into MPEG-7 content description queries.

3. A system as recited in claim 2, wherein said programming comprises:
    an application program executable on said computer.

4. A system as recited in claim 3, wherein said application program comprises:
    a browser or plug-in for use within a browser.

5. A system as recited in claim 3, wherein said application program comprises:
    an interactive web site.

6. A system as recited in claim 5, further comprising:
    means for collecting query information about generated content description queries and resultant searches from said interactive web site; and
    means for communicating said query information to a destination site as selected from said resultant searches from said interactive web site.

7. A system as recited in claim 6, wherein said means for collecting query information comprises:
    data structures associated with said interactive web site.

8. A system as recited in claim 6, wherein said means for communicating said query information comprises:
    a link to said data structure which is passed to said destination web site.

9. A system as recited in claim 1, further comprising:
    a library of MPEG-7 related queries and functions from which the user may build a content description query.

10. A system as recited in claim 1, further comprising:
    a database containing MPEG-7 content descriptions rules.

11. A system as recited in claim 1, further comprising:
    a syntax checker which utilizes MPEG-7 content description rules from said database to monitor the user query being built and to alert said user to improper syntax so that correction may be performed.

12. A system as recited in claim 1, further comprising:
    a hit processing routine configured for ordering responses being returned from said collection searching means according to user selected preferences.

13. A system as recited in claim 12:
    wherein said hit processing routine is configured to order the responses based on the terms and relationships found within the submitted query.

14. A system as recited in claim 12:
    wherein said hit processing routine is configured to order the responses based on an explicit ordering statement which expresses a set of terms and relationships upon which response ordering is to be based.

15. A system as recited in claim 1:
    wherein said means for searching a collection of digital material objects is configured to perform the search over the Internet.

16. A system as recited in claim 1, wherein said means for searching a collection of digital material objects comprises:
    a search engine configured for matching elements from a received MPEG-7 content description query to elements within MPEG-7 content descriptions that are embedded within the collection of digital materials.

17. A system as recited in claim 1, wherein said means for searching a collection of digital material objects comprises:
    a search engine configured for matching elements from a received MPEG-7 content description query to elements associated with MPEG-7 content descriptions within a database containing information about a collection of digital material objects which contain embedded MPEG-7 descriptors.

18. A system as recited in claim 1:
    wherein said means for generating MPEG-7 content descriptions is configured for generating queries for use in selecting multimedia content sought by said user in response to capturing non-textual descriptions of the content sought.

19. A system for generating queries for use in selecting content being sought by a user, comprising:
    a computer configured to communicate over a network with users submitting queries;
    query interface programming executable on said computer for capturing descriptions of the content sought by said user; and
    converter programming executable on said computer configured for converting captured descriptions into textual MPEG-7 content descriptions which are formatted for submission to a properly configured search engine capable of searching content resources having embedded MPEG-7 content descriptions using a string search routine.

20. A system as recited in claim 19:
    wherein said query interface programming is configured to capture descriptions of multimedia content elements.

21. A system as recited in claim 20:
    wherein said multimedia content elements are selected from the group of multimedia content consisting essentially of audio, video, animations, music, images, sound effects, graphics, CAD files, recordings, and icons.

22. A system as recited in claim 19:
    wherein said query interface programming and converter programming comprise a portion of an application program executable on said computer.

23. A system as recited in claim 19:
    wherein said query interface programming and converter programming comprise a portion of a browser, or browser plug-in.

24. A system as recited in claim 19:
    wherein said query interface programming and converter programming comprise a portion of an interactive web site.

25. A system as recited in claim 19, further comprising:
a non-text capture routine within the query interface programming configured to capture non-textual information provided by the user to which the generated MPEG-7 content description is responsive.

26. A system as recited in claim 25:
wherein said non-text capture routine is capable of capturing sketch input.

27. A system as recited in claim 25:
wherein said non-text capture routine is capable of capturing statistics relating to content being sought.

28. A system as recited in claim 19, further comprising:
a library of predetermined MPEG-7 content queries, MPEG-7 content query elements, and query functions that are configured for display within said means for generating queries.

29. A system as recited in claim 28:
wherein said query interface is configured so that elements may be copied from said library and pasted into a query being built.

30. A system as recited in claim 19:
wherein said query interface programming is configured for processing macro functions that allow user content selection input to be received in a generalized format which is later expanded into a search engine compatible format.

31. A system configured for searching through a collection of multimedia data resources to find digital material objects, comprising:
a first computer configured to communicate over a network with users submitting queries;
query interface programming executable on said first computer for capturing descriptions of the content sought by said user;
converting programming executable on said first computer configured for converting captured description into MPEG-7 content descriptions which are formatted for submission to a search engine configure for searching content resources having embedded MPEG-7 content descriptions;
a second computer having a network interface for communication to and from users submitting queries to said first computer; and
programming executable on said second computer, said programming comprising,
an interface routine of said second computer configured for receiving MPEG-7 content descriptions, and
a string search routine configured to search through an associated database, or file collection, and return information about files whose associated headers contain MPEG-7 content description elements that coincide with the MPEG-7 content descriptions received by said interface routine.

32. A system as recited in claim 31, further comprising:
a parser routine which receives MPEG-7 content descriptions from said interface routine of said computer and is configured to convert the received MPEG-7 content descriptions into a simplified format which allows the string search routine to operate at a higher search speed.

33. A system as recited in claim 32:
wherein said conversion to a simplified format comprises disassembling the MPEG-7 content description into elements which may be searched for in parallel.

34. A method of searching content-laden objects having embedded MPEG-7 content descriptions, comprising:
constructing queries from non-text information captured by a query interface within a query generation tool, said queries being generated having MPEG-7 descriptors and description schemes;
submitting said queries to a search engine capable of matching elements of said query against embedded MPEG-7 content descriptions associated with digital material objects within the searched collection of content-laden objects; and
posting search results responsive to the matching elements and returning information about the associated digital material object.

35. A method as recited in claim 34, further comprising:
parsing the submitted query into a simplified format for use by the search engine; toward speeding searches by the search engine through the content-laden objects.

36. A method as recited in claim 34, further comprising:
billing users for usage of the query generation tool according to a usage metric as selected from a group of usage metrics consisting essentially of time units, utilized resources, subscription rate, actions, and combinations thereof.

37. A method as recited in claim 36, further comprising:
restricting user billing to usage that is followed by a user access of the query results.

38. A method of searching content-laden multimedia objects having embedded MPEG-7 content descriptions, comprising:
capturing of non-textual query information from a user;
converting said non-textual query information into a textual search query based on MPEG-7 descriptors for receipt by a search engine;
executing said search query on a search engine to generate a set of search results, at a given search site;
selecting a link from the search results to open a destination site; and
passing said query information from said search site to said destination site.

39. A method as recited in claim 38:
wherein said query information comprises a query string utilized producing said destination link.

40. A method as recited in claim 38:
wherein said query information comprises an order value indicative of where said destination link fell in the search returns.

41. A method as recited in claim 38:
wherein said query information comprises a return link to the search site.

42. A method as recited in claim 38:
wherein said return link is unique for the given query so that programming executable for said destination site may extract further information from said search site.

43. A method as recited in claim 42:
wherein said further information may be extracted in exchange for remuneration from the organization associated with said destination site.

44. A system for generating queries for use in selecting multimedia content being sought by a user, comprising:
a computer configured to communicate with users submitting queries;
query interface programming executable on said computer for capturing non-textual descriptions of the content sought by said user; and
converter programming executable on said computer configured for capturing non-textual descriptions and converting them into MPEG-7 content descriptions formatted for submission to a search engine configured for responding to MPEG-7 search queries by posting search results containing information about multimedia digital material objects which match said non-textual descriptions.

45. A system as recited in claim 44:

wherein said query interface programming is configured for capturing sketch input as the non-textual description provided by the user.

46. A system as recited in claim 44:

further comprising programming within said query interface programming for capturing statistics relating to content being sought.

47. A system as recited in claim 44:

further comprising programming within said query interface programming for providing a library of query elements from which a user generates a query for content being sought.

48. A system as recited in claim 47:

wherein said query interface programming is configured for copying elements from said library and pasting them into a query being built.

* * * * *

UNITED STATES PATENT AND TRADEMARK OFFICE
CERTIFICATE OF CORRECTION

| | | |
|---|---|---|
| PATENT NO. | : 7,664,830 B2 | Page 1 of 1 |
| APPLICATION NO. | : 10/112610 | |
| DATED | : February 16, 2010 | |
| INVENTOR(S) | : Hawley K. Rising, III | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1617 days.

Signed and Sealed this

Seventh Day of December, 2010

David J. Kappos
*Director of the United States Patent and Trademark Office*